United States Patent
Vertova et al.

(10) Patent No.: US 11,111,953 B2
(45) Date of Patent: Sep. 7, 2021

(54) FLUID FLOW CONTROL DEVICE HAVING A DRAINING BODY BEARING

(71) Applicant: EMERSON AUTOMATION SOLUTIONS FINAL CONTROL ITALIA S.R.L., Lugagnano Val D'arda (IT)

(72) Inventors: Luca Vertova, Cremona (IT); Mauro Amici, Alseno (IT)

(73) Assignees: EMERSON AUTOMATION SOLUTIONS FINAL, Lugagnano Val D'arda (IT); CONTROL ITALIA S.R.L., Lugagnano Val D'arda (IT)

(*) Notice: Subject to any disclaimer, the term of this patent is extended or adjusted under 35 U.S.C. 154(b) by 0 days.

(21) Appl. No.: 16/629,413

(22) PCT Filed: Jul. 4, 2019

(86) PCT No.: PCT/EP2019/068047
§ 371 (c)(1),
(2) Date: Jan. 8, 2020

(87) PCT Pub. No.: WO2020/008010
PCT Pub. Date: Jan. 9, 2020

(65) Prior Publication Data
US 2020/0141443 A1    May 7, 2020

Related U.S. Application Data
(60) Provisional application No. 62/694,302, filed on Jul. 5, 2018.

(51) Int. Cl.
*F16C 17/02*    (2006.01)
*F16K 1/22*    (2006.01)
(Continued)

(52) U.S. Cl.
CPC ............ *F16C 17/026* (2013.01); *F16K 1/224* (2013.01); *F16C 33/107* (2013.01);
(Continued)

(58) Field of Classification Search
CPC ........ F16C 17/02; F16C 17/10; F16C 17/107; F16C 17/18; F16C 33/10; F16C 33/1045;
(Continued)

(56) References Cited

U.S. PATENT DOCUMENTS 2,625,448 A * 1/1953 Underwood .......... F16C 17/026
384/291
5,936,699 A * 8/1999 Wang ........................ G02C 5/10
351/113
(Continued)

FOREIGN PATENT DOCUMENTS

EP    2 107 231 A1    10/2009
FR    751198 A *    8/1933    .............. F16C 17/18
(Continued)

OTHER PUBLICATIONS

International Search Report and Written Opinion for Application No. PCT/EP2019/069047, dated Oct. 24, 2019.

*Primary Examiner* — Phillip A Johnson
(74) *Attorney, Agent, or Firm* — Marshall, Gerstein & Borun LLP (57) ABSTRACT

A fluid flow control device includes a valve body forming a channel defining a fluid flow path extending from an inlet to an outlet, a shaft having a first portion and a second portion, a flow control member coupled to the first portion of the shaft, and a bearing comprising an elongated body having a first end, a second end, an inner surface defining an interior volume, and an outer surface. The bearing is dimensioned to accommodate the shaft in the interior volume and includes at least one opening extending between the inner surface and (Continued)

the outer surface and at least one elongated channel formed on the outer surface. The elongated channel extends a length between the first end and the second end of the elongated body.

16 Claims, 5 Drawing Sheets

(51) Int. Cl.
*F16C 33/10* (2006.01)
*F16K 1/226* (2006.01)

(52) U.S. Cl.
CPC ...... *F16C 33/1065* (2013.01); *F16C 2361/91* (2013.01); *F16K 1/2261* (2013.01)

(58) Field of Classification Search
CPC  F16C 33/1065; F16C 33/107; F16C 2360/91; F16K 1/224; F16K 1/225; F16K 1/2261
See application file for complete search history.

(56) References Cited

U.S. PATENT DOCUMENTS

| 2005/0117822 | A1 |   | 6/2005  | Chen et al. |                |
|---|---|---|---|---|---|
| 2007/0172162 | A1 |   | 7/2007  | Liu         |                |
| 2009/0317031 | A1 | * | 12/2009 | Pfundt      | F16C 33/7896   |
|              |    |   |         |             | 384/569        |
| 2013/0087730 | A1 | * | 4/2013  | Seko        | F16K 1/32      |
|              |    |   |         |             | 251/318        |
| 2015/0083956 | A1 | * | 3/2015  | Gerards     | F02D 9/106     |
|              |    |   |         |             | 251/308        |
| 2018/0119565 | A1 |   | 5/2018  | Pless       |                |

FOREIGN PATENT DOCUMENTS

| GB |  1174660 A | * | 12/1969 | .......... F16C 33/1065 |
|---|---|---|---|---|
| JP | 2002-213450 A |   | 7/2002  |   |
| JP | 2005-048890 A |   | 2/2005  |   |
| JP | 2011-153668 A |   | 8/2011  |   |

* cited by examiner

FLUID FLOW CONTROL DEVICE HAVING A DRAINING BODY BEARING

CROSS-REFERENCE TO RELATED APPLICATIONS

This is the United States National Phase of PCT/EP19/68047 filed Jul. 4, 2019, which claims the priority benefit of U.S. Provisional Application No. 62/694,302 filed Jul. 5, 2018, the entire contents of each of which are hereby incorporated herein by reference.

FIELD OF THE DISCLOSURE

The present disclosure generally relates to fluid flow control devices and, more particularly, to a body bearing that allows particles to drain therefrom.

BACKGROUND

Isolation and control valves are commonly used in process control systems to isolate or control the pressure and/or flow of process fluids (e.g., liquids or gases). A valve typically includes a manual device or an actuator apparatus (e.g., a pneumatic actuator, a hydraulic actuator, etc.) operatively coupled to the flow control member of the valve to enable the valve isolation or control function. In operation of control valves, a controller is often employed to supply a control fluid (e.g., air) to the actuator, which, in turn, positions the flow control member (e.g., a valve gate, a plug, a closure member, etc.) to a desired position relative to a valve seat to control or regulate the fluid flow through the valve.

Offset metal seated valves are typically used in process the industries where isolation or control of processes having critical temperatures or other properties is necessary. For example, triple offset metal seated quarter turn valves may be employed due to superior sealing capabilities. These valves typically have an elongated, rotating stem or shaft coupled to the flow control member (e.g., a disc) that sealingly engages the valve seat. Such valves typically include a bearing disposed around a portion of the shaft that supports the shaft.

In some of these applications, molten salts are used as a heat transfer fluid. These molten salts typically solidify at temperatures below approximately 230° C. To avoid the molten salts from solidifying, plant operators may keep fluid flow lines heated above this solidification temperature. However, maintaining such temperatures can be costly and may lead to excessive wear on components. As an alternative, in some environments, the fluid lines may be periodically drained, thereby allowing the lines to be cooled down. However, existing bearings do not facilitate complete draining of the molten salt from portions of the valve (e.g., the space between the shaft and the bearing), which may lead to a freezing of the fluid that can render the control valve inoperable until the operating temperature exceeds the solidification temperature.

SUMMARY

In accordance with one embodiment of the present disclosure, a bearing includes an elongated body having a first end, a second end, an inner surface defining an interior volume of the elongated body, an outer surface, at least one opening extending between the inner surface and the outer surface, and at least one elongated channel formed on the outer surface of the elongated body. The elongated body extends along a longitudinal axis and defines a shaft abutment region extending at least partially between the first end and the second end along the longitudinal axis. The elongated channel extends a length between the first end of the elongated body and the second end of the elongated body.

In some forms, the at least one elongated channel may extend in a direction parallel to the central longitudinal axis of the elongated body. In other approaches, the at least one elongated channel may form a helical pattern on the outer surface of the elongated body. Other examples are possible.

In some examples, the inner surface of the elongated body includes at least one contact region between the first and second ends. The at least one contact region extends inwardly into the interior volume of the elongated body. The at least one contact region may accommodate a shaft to provide a support surface. The at least one contact region may also include a tapered or chamfered region adjacent to the support surface.

In some approaches, the bearing may have approximately eight elongated channels. The bearing may further have approximately eight openings. The openings and/or elongated channels may be arranged radially about the central longitudinal axis. In examples, the opening or openings may have a central longitudinal axis, and the elongated channel or channels may also have a central longitudinal axis. The opening central longitudinal axis may be collinear with the channel central longitudinal axis.

In accordance with another embodiment of the present disclosure, a fluid flow control device includes a valve body forming a channel defining a fluid flow path extending from an inlet to an outlet, a shaft, a flow control member coupled to the shaft, and a bearing comprising an elongated body having a first end, a second end, an inner surface defining an interior volume, and an outer surface. The bearing is dimensioned to accommodate the shaft in the interior volume and includes at least one opening extending between the inner surface and the outer surface and at least one elongated channel formed on the outer surface. The elongated channel extends a length between the first end and the second end of the elongated body.

BRIEF DESCRIPTION OF THE DRAWINGS

The above needs are at least partially met through provision of the fluid flow control device described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a fluid flow control device having a draining bearing is provided. The draining bearing is configured to allow heat transfer fluids (e.g., molten salts) to drain from an area between the shaft and the bearing, thereby facilitating complete drainage of the fluid flow control device prior to reducing operational temperatures. Accordingly, because the fluid has completely drained from the fluid flow control device, the likelihood of the fluid flow control device becoming inoperable is reduced.

Figure 1A:
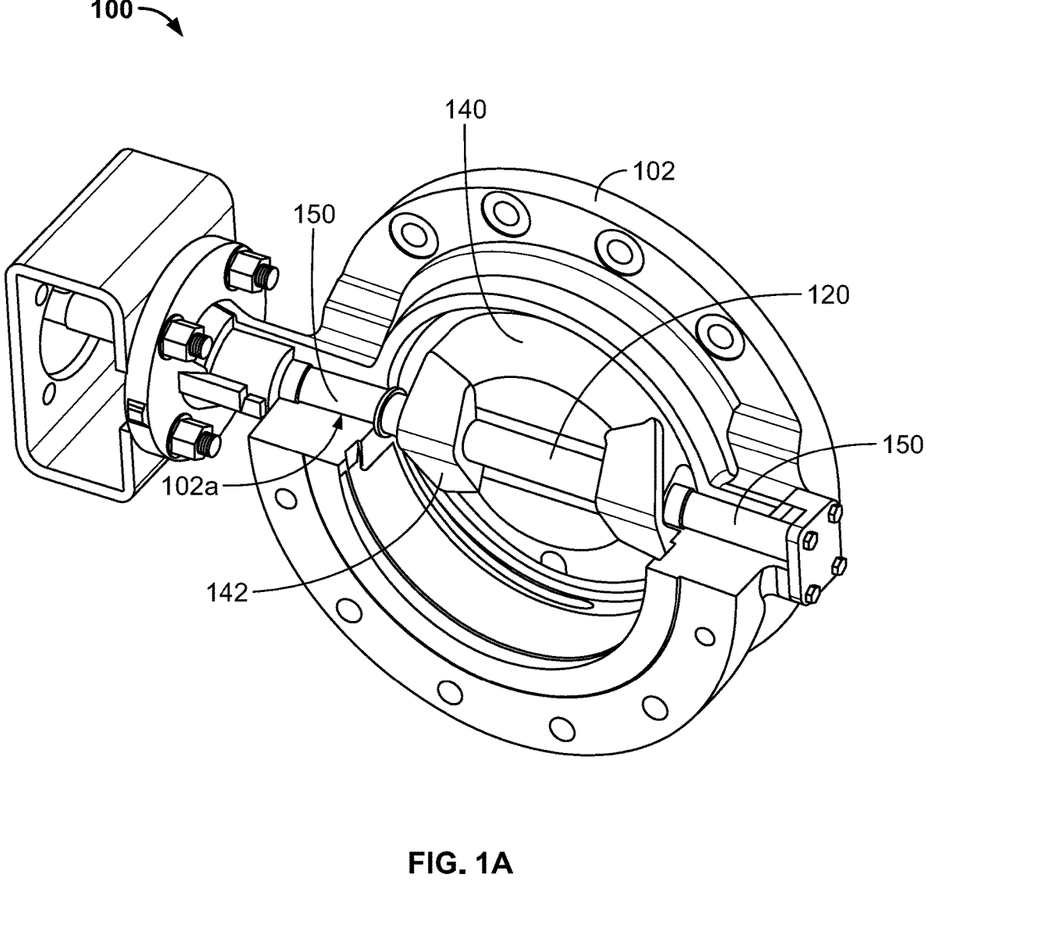
FIG. 1a illustrates a perspective view of an example flow control member having a draining bearing in accordance with various embodiments of the present disclosure.
Figure 1B:
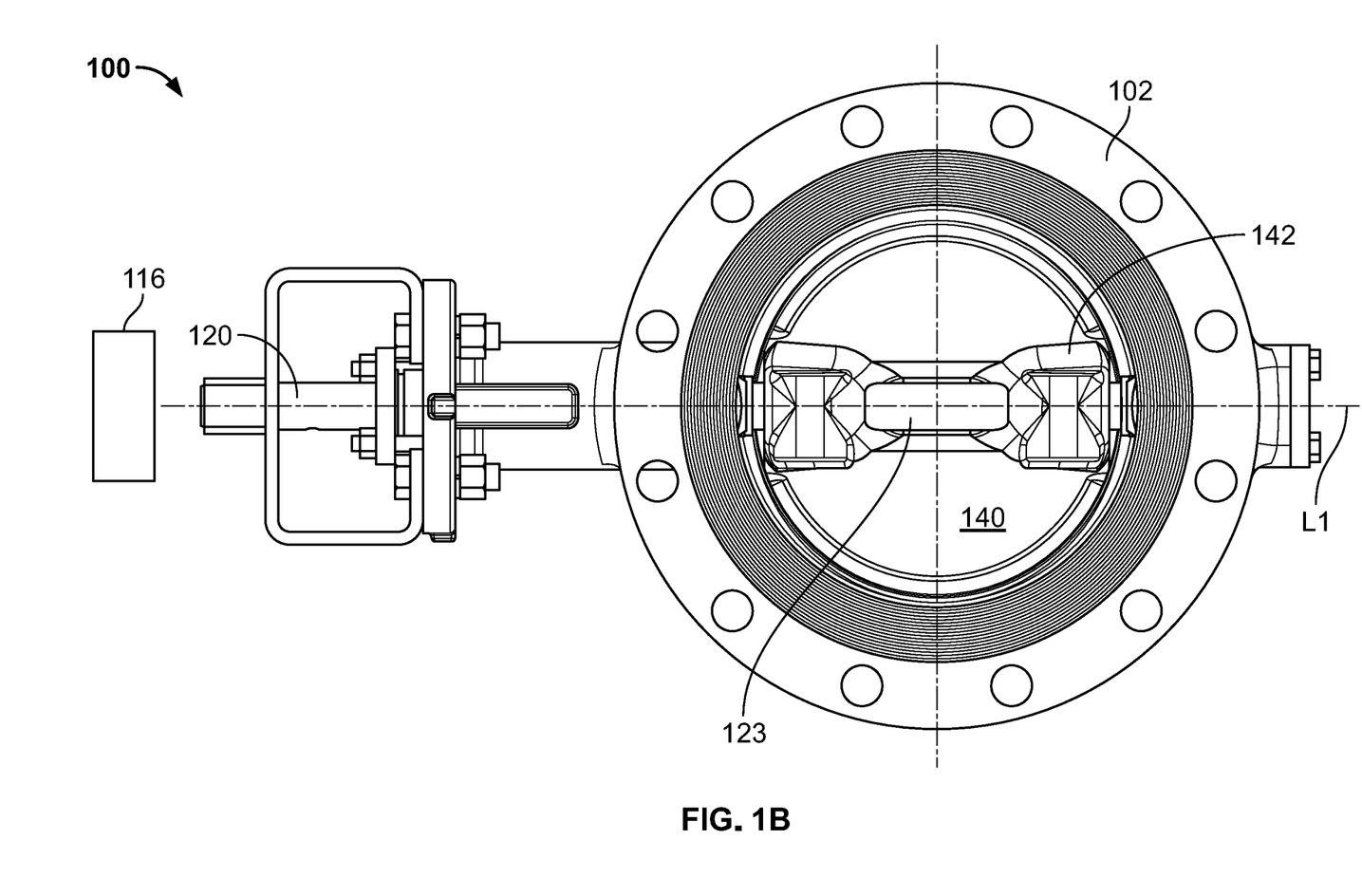
FIG. 1b illustrates a front plan view of an example flow control member having a draining bearing in accordance with various embodiments of the present disclosure.
Figure 1C:
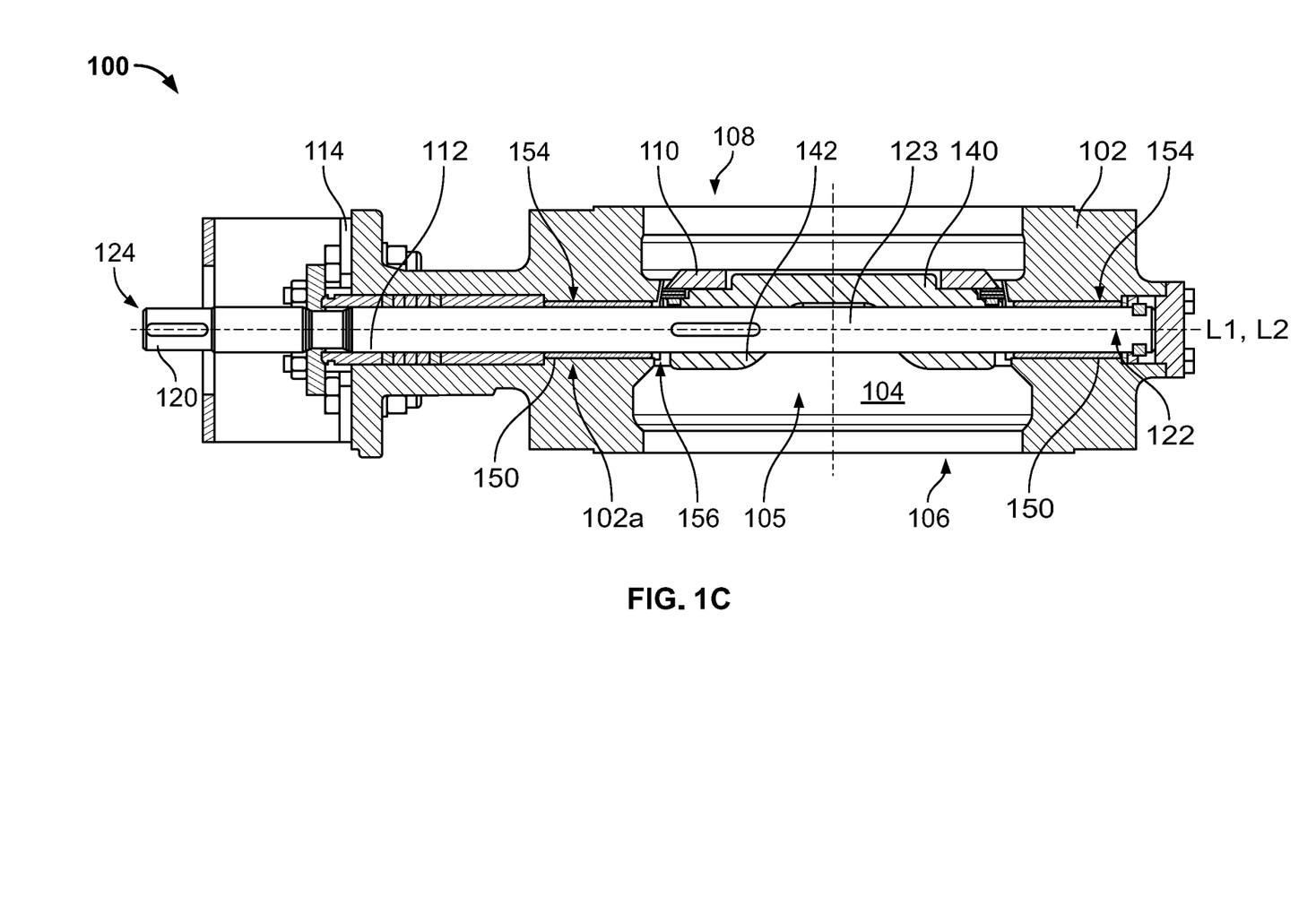
FIG. 1c illustrates a side partial cross-sectional view of an example flow control member having a draining bearing in accordance with various embodiments of the present disclosure

Referring now to the drawings, and in particular to FIGS. 1a-1c, an example fluid flow control device (e.g., a triple offset valve) 100 can include a valve body 102, a shaft 120, a flow control member 140, and any number of bearings 150. The valve body 102 forms a channel 104 defining a fluid flow path 105 that extends from an inlet 106 of the valve body 102 to an outlet 108 of the valve body. The valve body 102 includes a bore 102a positioned adjacent to the fluid flow path 105 and further at least partially forms a valve seat 110. A valve bracket 114 at least partially covers an opening 112 of the valve body 102 and can couple the valve body 102 to an actuator 116 or other actuating device. The actuator 116 is operably coupled to the shaft 120 to impart movement thereon. The valve 100 may include any number of additional components to assist in operation such as, for example, seals, seat retainers, additional bearings, gaskets, washers, and/or packing rings.

The shaft 120 has a first end 122 and a second end 124 and an elongated body 123 extending along a longitudinal axis L1. In the illustrated example, the second end 124 of the shaft 120 is disposed through the opening 112. The first end 122 of the shaft 120 is at least partially disposed within the bore 102a.

In the illustrated example, the flow control member 140 is a disc that is coupled to a portion of the elongated body 123 of the shaft 120. In some examples, the disc 140 includes any number of coupling portions 142, such as, for example, an opening or bore, used to secure the shaft 120 thereto. Other examples are possible. This coupling between the disc 140 and the shaft 120 causes the disc 140 to move (e.g., to rotate) in conjunction with the shaft 120.

Figure 2:
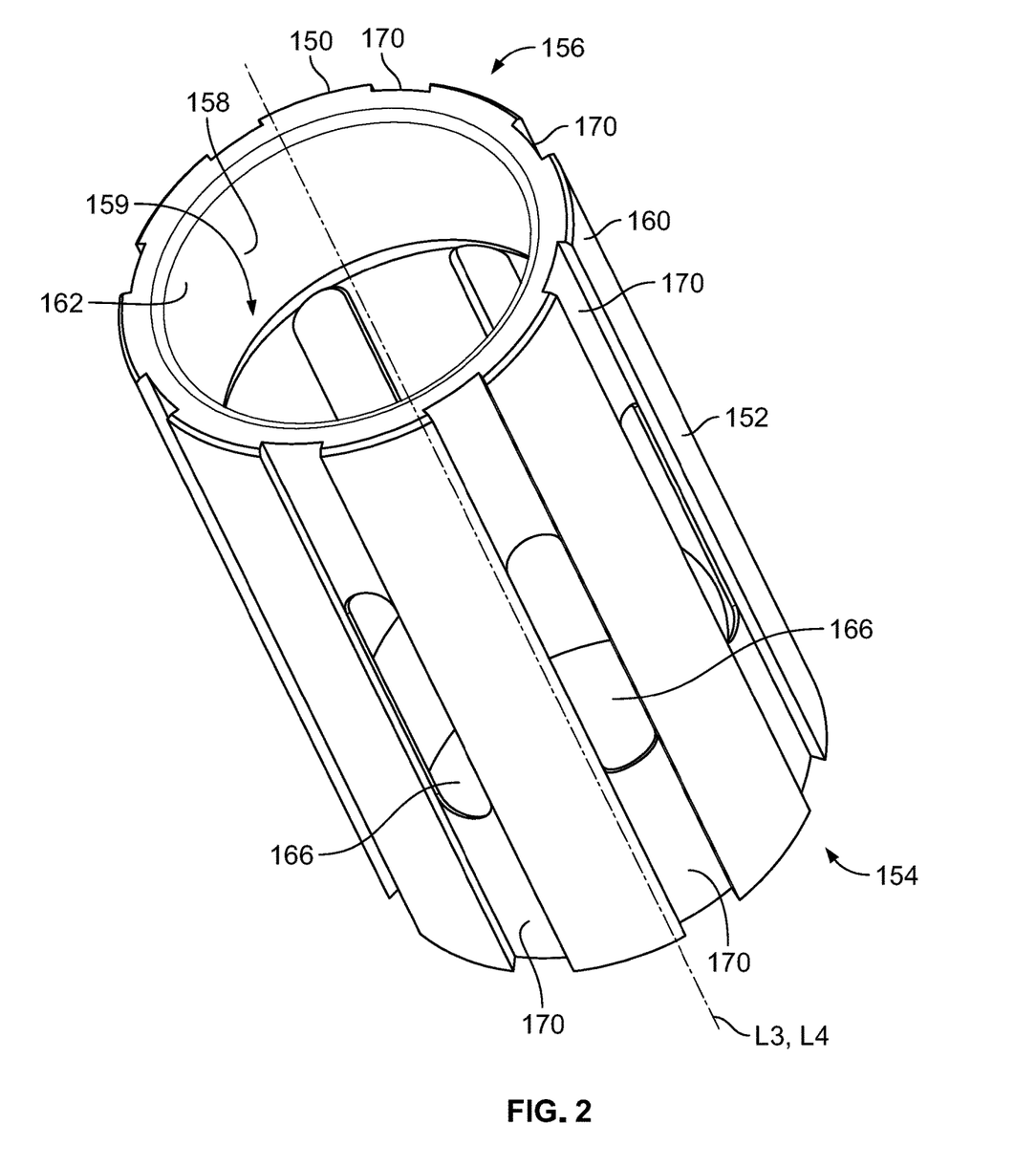
FIG. 2 illustrates a perspective view of an example draining bearing in accordance with various embodiments of the disclosure.
Figure 3:
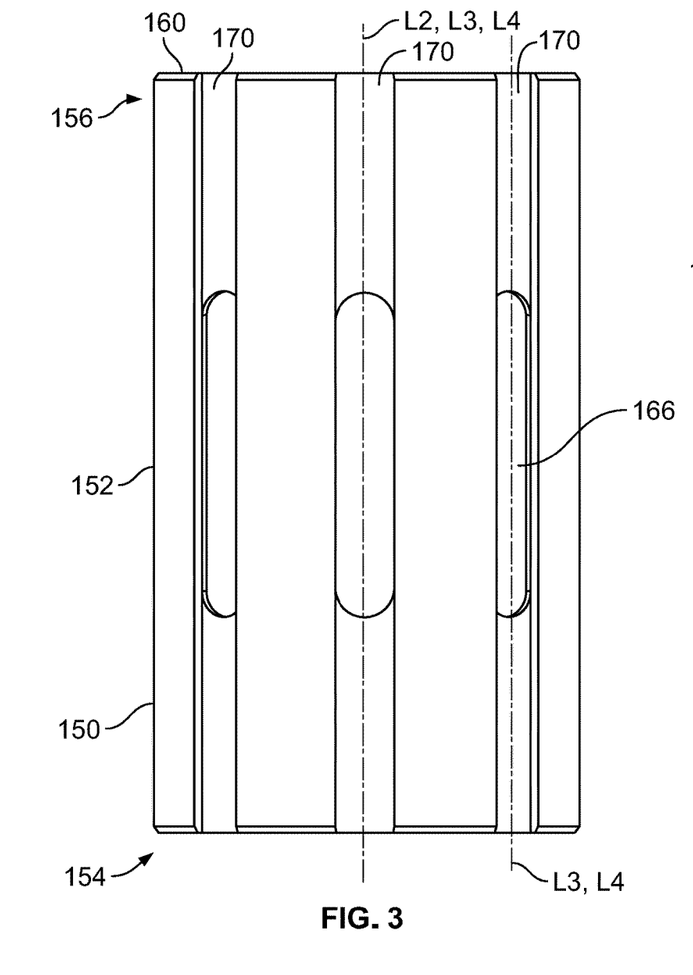
FIG. 3 illustrates a front elevation view of the example draining bearing of FIG. 2 in accordance with various embodiments of the disclosure.
Figure 4:
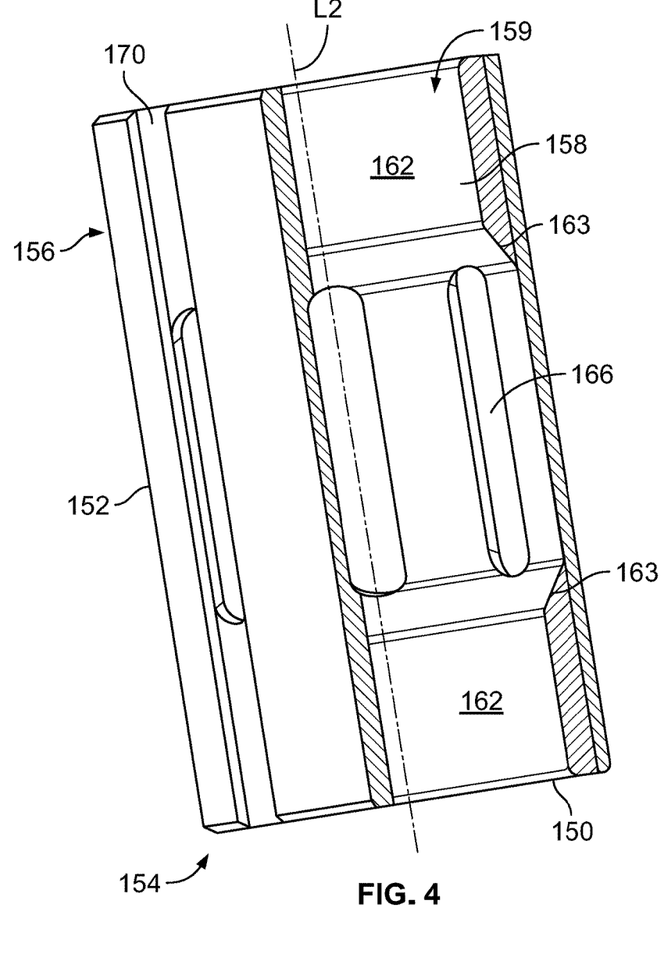
FIG. 4 illustrates a cross-sectional view of the example draining bearing of FIGS. 2 and 3 in accordance with various embodiments of the disclosure.

Turning to FIGS. 2-4, the bearing 150 includes an elongated body 152 extending along a longitudinal axis L2 and having a first end 154, a second end 156, an inner surface 158, and outer surface 160. The inner surface 158 defines an interior volume 159 and a shaft abutment region 162. The bearing 150 further includes an opening or openings 166 having a longitudinal axis L3 (illustrated in FIGS. 2 and 3), and an elongated channel or channels 170 having a longitudinal axis L4 (illustrated in FIGS. 2 and 3). The opening or openings 166 extend between the inner surface 158 and the outer surface 160. The elongated channel or channels 170 are formed on the outer surface 160. The bearing 150 is adapted to be at least partially disposed within the bore 102a of the valve body 102, and as illustrated in FIG. 1c, may extend a length into the fluid flow path 105.

The elongated channel or channels 170 extends a length between the first end 154 and the second end 156 of the outer surface 160 in the form of a groove formed on the outer surface 160. In on example, and as illustrated in FIGS. 2-5, the elongated channel or channels 170 may extend the entire length of the elongated body 152. While the depicted bearing #150 includes eight elongated channels 170 arranged radially about the longitudinal axis L2, any number of elongated channels 170 may be disposed on the outer surface 160 of the elongated body 152. In the illustrated example, the elongated channel or channels 170 extends in a parallel direction to the longitudinal axis L2. However, in some examples (not illustrated), the elongated channel or channels 170 may extend in a helical or other pattern about the outer surface 160 of the elongated body 152.

The opening or openings 166 extend a portion of the length of the elongated body 152. While the depicted bearing 150 includes eight openings 166 arranged radially about the longitudinal axis L2, any number of openings 166 may be disposed through the elongated body 152. The opening or openings 166 may have an elongated shape that, as illustrated in FIGS. 2-5, is positioned to be aligned with the position of the elongated channel or channels 170. In other words, for each opening 166 and elongated channel 170, the longitudinal axis L3 of the opening 166 may be collinear to the longitudinal axis L4 of the elongated channel 170. Other relative arrangements between the opening or openings 166 and the elongated channel or channels 170 are possible.

In the illustrated example, the bearing 150 includes two shaft abutment regions 162, with the first shaft abutment region 162 being positioned near the first end 154 of the elongated body 152 and the second shaft abutment region 162 being positioned near the second end 156 of the elongated body 152. However, in other examples, any number of shaft abutment regions 162 may be disposed along the length of the elongated body 152. The shaft abutment region 162 may extend inwardly into the interior volume 159 of the elongated body 152. So configured, a portion of the elongated body 152 of the bearing 150 does not support the shaft 120. As illustrated in FIG. 4, the shaft abutment region 162 may include a tapered region 163 that gradually increases the diameter of the shaft abutment region 162 when moving from the second end 156 of the bearing 150 to the first end 154 of the bearing. Accordingly, the tapered region 163 may define an expanded space formed around the shaft 120 that does not contact, and thus provides no support to the shaft 120.

The bearing 150, and specifically the shaft abutment region 162 may be dimensioned to accommodate a portion of the shaft 120 such that an outer diameter of the shaft 120 is approximately equal to or slightly less than an inner diameter of the shaft abutment region 162, thereby creating a close and/or friction fit between the shaft 120 and the shaft abutment region 162.

In some examples, the shaft abutment regions 162 may define an inner bearing ring that rotates relative to the elongated body 152 of the bearing 150. The bearing 150 may include any number of components (not shown) such as, for example, rolling elements, a cage, guide members, and the like, to facilitate relative movement between the shaft abutment regions 162 and the elongated body 152.

In operation, the first end 122 of the shaft 120 is inserted into the interior volume 159 of the bearing 150, thereby coming into contact with the shaft abutment regions 162. In some examples, the shaft 120 is fully inserted into the bearing 150, and in other examples, the shaft 120 may be partially inserted into a length of the elongated body 152 of the bearing 150. As such, the longitudinal axis L is collinear with the longitudinal axis L2. In one example environment, the valve 102 is positioned such that the shaft 120, and thus the longitudinal axis L1, is in an approximately horizontal orientation.

A controller (not shown) may provide a control signal to the actuator 116 operably coupled to the shaft 120. This control signal causes the actuator 116 to rotate the shaft 120 about the longitudinal axis L, thereby causing the disc 140 to rotate to either selectively abut against the valve seat 110 to create a seal, or to create an opening to allow fluid to flow from the inlet 106 of the valve body 102 to the outlet 108 of the valve body 102.

In some examples, because the first end 122 of the shaft 120 is frictionally coupled to the bearing 150 at the shaft abutment region 162, as the shaft 120 rotates about the longitudinal axis L, the shaft abutment region 162 also rotates freely relative to the elongated body 152 of the bearing 150. In other examples, the first end 122 of the shaft 120 may have an outer diameter that is small enough relative to the inner diameter of the shaft abutment region 162 to allow the shaft 120 rotate freely within the interior volume 159 of the bearing 150. As such, the shaft abutment region 162 may act as a guide or support to limit lateral movement of the shaft 120.

In yet other examples, the first end 122 of the shaft 120 may be frictionally coupled to the shaft abutment region 162 as previously described. However, the shaft abutment region 162 may be fixed relative to the elongated body 152 of the bearing 150. Accordingly, as the shaft 120 rotates, the entire bearing 150 will rotate relative to the bore 102a. As such, the elongated body 152 may act as a guide or support relative to the bore 102a to limit lateral movement of the coupled components. Other examples and configurations are possible.

During operation of the valve 102, fluid (e.g., a molten salt) traversing the fluid flow path 105 may enter the interior volume 159 of the bearing 150 between the outer surface of the shaft 120 and the inner surface 158 of the bearing 150. The fluid may exit the interior region 159 of the bearing 150 via the opening or openings 166, whereupon the fluid may flow through the elongated channel or channels 170. When the bearing 150 is disposed in the bore 102a, the elongated channel or channels 170 form a passageway to allow the fluid to flow in a direction towards the second end 156 of the bearing 150, thus ultimately exiting the bore 102a to return to the fluid flow path 105.

In examples where the bearing 150 includes a number of elongated channels 170 (e.g., eight elongated channels) disposed on the outer surface 160, when the valve 102 is positioned horizontally, at least one elongated channel 170 and opening 166 will be positioned below the second end 122 of the shaft 120. Accordingly, fluid that enters into the interior volume 159 of the bearing will exit through the opening 166, traverse the elongated channel 170, and return to the fluid flow path 105, thereby draining the fluid from the interior volume 159 of the bearing 150.

The bearing 150 described herein may be used to fully drain the valve 102. As a result, the fluid will not freeze while in the valve 102, thereby reducing the inability to operate the valve without needing to restore suitably high operating temperatures. Further, in examples where the second end 156 of the bearing extends into the fluid flow channel 105, fluid may be swept out of the elongated channel or channels 170 via cohesion and/or capillary action during draining or operation.

In other examples (not illustrated) the inner surface 158 of the bearing 150 may also include any number of elongated channels. These channels may be arranged in any number of configurations. For example, the channels may be parallel to the longitudinal axis L2 of the bearing 150, the channels may be configured in a helical or other pattern, and the like.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

Unless specified otherwise, any of the feature or characteristics of any one of the embodiments of the fluid flow control device having a draining bearing disclosed herein may be combined with the features or characteristics of any other embodiments of the fluid flow control device having a draining bearing.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A bearing for a fluid flow control device, the bearing comprising:
    an elongated body having a first end, a second end, an inner surface defining an interior volume of the elongated body, and an outer surface, the elongated body extending along a longitudinal axis and defining a shaft abutment region extending at least partially between the first end and the second end along the longitudinal axis;
    at least one opening extending between the inner surface and the outer surface; and
    at least one elongated channel formed on the outer surface of the elongated body, the elongated channel extending a length between the first end of the elongated body and the second end of the elongated body.

2. The bearing of claim 1, wherein the at least one elongated channel extends in a direction parallel to the central longitudinal axis.

3. The bearing of claim 1, wherein the shaft abutment region extends inwardly into the interior volume of the elongated body.

4. The bearing of claim 3, wherein the shaft abutment region comprises a tapered region.

5. The bearing of claim 1, further comprising a plurality of openings, wherein the plurality of openings are arranged radially about the central longitudinal axis.

6. The bearing of claim 1, wherein the at least one elongated channel comprises eight elongated channels.

7. The bearing of claim 1, wherein the at least one opening comprises eight openings.

8. The bearing of claim 1, wherein the at least one opening comprises an opening central longitudinal axis and the at least one elongated channel comprises a channel central longitudinal axis, wherein the opening central longitudinal axis is collinear with the channel central longitudinal axis.

9. A fluid flow control device comprising:
a valve body forming a channel defining a fluid flow path extending from an inlet of the valve body to an outlet of the valve body, the valve body further defining a valve seat disposed in the fluid flow path;
a shaft being at least partially disposed within the fluid flow path;
a flow control member coupled to the shaft, the flow control member being disposed in the fluid flow path and being adapted to control fluid flow along the fluid flow path of the valve by sealingly engaging the valve seat;
a bearing comprising an elongated body having a first end, a second end, an inner surface defining an interior volume of the elongated body, and an outer surface, the elongated body extending along a longitudinal axis, the bearing being dimensioned to accommodate the shaft in the interior volume of the elongated body, the bearing further comprising at least one opening extending between the inner surface and the outer surface and at least one elongated channel formed on the outer surface of the elongated body, the elongated channel extending a length between the first end of the elongated body and the second end of the elongated body.

10. The fluid flow control device of claim 9, wherein the at least one elongated channel extends in a direction parallel to the central longitudinal axis.

11. The fluid flow control device of claim 9, wherein the inner surface of the elongated body defines a shaft abutment region extending inwardly into an interior volume of the elongated body.

12. The fluid flow control device of claim 11, wherein the shaft abutment region comprises a tapered region.

13. The fluid flow control device of claim 11, further comprising a plurality of openings, wherein the plurality of openings are arranged radially about the central longitudinal axis.

14. The fluid flow control device of claim 9, wherein the at least one opening comprises an opening central longitudinal axis and the at least one elongated channel comprises a channel central longitudinal axis, wherein the opening central longitudinal axis is collinear with the channel central longitudinal axis.

15. The fluid flow control device of claim 9, wherein the at least one elongated channel comprises eight elongated channels.

16. The fluid flow control device of claim 9, wherein the at least one opening comprises eight openings.

* * * * *

UNITED STATES PATENT AND TRADEMARK OFFICE
CERTIFICATE OF CORRECTION

| | |
|---|---|
| PATENT NO. | : 11,111,953 B2 |
| APPLICATION NO. | : 16/629413 |
| DATED | : September 7, 2021 |
| INVENTOR(S) | : Luca Vertova et al. |

It is certified that error appears in the above-identified patent and that said Letters Patent is hereby corrected as shown below:

In the Specification

At Column 2, Lines 57-58, "disclosure" should be -- disclosure; --.

At Column 4, Line 19, "#150" should be -- 150 --.

At Column 5, Line 53, "interior region" should be -- interior volume --.

At Column 5, Lines 65-66, "second end 122" should be -- second end 124 --.

Signed and Sealed this
Fourteenth Day of June, 2022

Katherine Kelly Vidal
*Director of the United States Patent and Trademark Office*